(12) United States Patent
Schwarz (10) Patent No.: US 10,182,550 B2
(45) Date of Patent: Jan. 22, 2019

(54) CLIMATE CONTROL APPARATUS FOR A CLEANROOM LIVESTOCK BUILDING

(71) Applicant: Big Dutchman International GmbH, Vechta (DE)

(72) Inventor: Armin Schwarz, Vechta (DE)

(73) Assignee: BIG DUTCHMAN INTERNATIONAL GbmH, Vechta (DE)

(*) Notice: Subject to any disclaimer, the term of this patent is extended or adjusted under 35 U.S.C. 154(b) by 1120 days.

(21) Appl. No.: 14/024,766

(22) Filed: Sep. 12, 2013

(65) Prior Publication Data

US 2014/0080401 A1    Mar. 20, 2014

(30) Foreign Application Priority Data

Sep. 14, 2012 (DE) .................... 20 2012 008 814 U (51) Int. Cl.
| | |
|---|---|
| F24F 11/00 | (2018.01) |
| A01K 1/00 | (2006.01) |
| F24F 11/30 | (2018.01) |
| F24F 110/10 | (2018.01) |
| F24F 110/40 | (2018.01) |

(52) U.S. Cl.
CPC .......... *A01K 1/0052* (2013.01); *A01K 1/0076* (2013.01); *F24F 11/0001* (2013.01); *F24F 11/30* (2018.01); *F24F 2011/0002* (2013.01); *F24F 2110/10* (2018.01); *F24F 2110/40* (2018.01)

(58) Field of Classification Search
CPC . A01K 1/0052; A01K 1/0076; F24F 11/0001; F24F 11/0012; F24F 2011/0002; F24F 2011/0042

USPC .................................................. 454/238, 187
See application file for complete search history.

(56) References Cited

U.S. PATENT DOCUMENTS

| | | | |
|---|---|---|---|
| 4,445,426 A * | 5/1984 | Bohanon, Sr. .......... | F24F 7/013 454/351 |
| 5,336,131 A | 8/1994 | Crider et al. | |
| 2010/0248611 A1* | 9/2010 | Conger .................. | A01K 1/031 454/255 |

FOREIGN PATENT DOCUMENTS

| | | |
|---|---|---|
| DE | 171117 | 7/1905 |
| DE | 3124334 | 1/1983 |

(Continued)

OTHER PUBLICATIONS

German Search Report (dated Jun. 6, 2013).

*Primary Examiner* — Vivek Shirsat
(74) *Attorney, Agent, or Firm* — Price Heneveld LLP (57) ABSTRACT

A climate control apparatus for a cleanroom livestock building includes a supply air unit, comprising a supply air conveyor device, an exhaust air unit comprising an exhaust air conveyor device, a temperature sensor, an air pressure sensor, and a climate control unit. The climate control apparatus is adapted to reduce the volume of air conveyed by the exhaust air unit whenever the air pressure detected by the air pressure sensor falls below a predetermined lower air pressure limit value, increase the volume of air conveyed by the exhaust air unit whenever the air pressure detected by the air pressure sensor exceeds a predetermined upper air pressure limit value, and increase the volume of air conveyed with the supply air unit when the temperature detected by the temperature sensor exceeds a predetermined first upper temperature limit value.

14 Claims, 1 Drawing Sheet

(56) References Cited

FOREIGN PATENT DOCUMENTS

| | | |
|---|---:|---|
| DE | 4127179 | 2/1993 |
| DE | 9217896 | 8/1993 |
| DE | 19634708 | 3/1998 |
| DE | 10208298 | 9/2003 |
| DE | 60013601 | 8/2005 |
| DE | 102011107906 | 2/2012 |
| EP | 0100214 | 8/1984 |
| GB | 1205895 | 9/1970 |

* cited by examiner

CLIMATE CONTROL APPARATUS FOR A CLEANROOM LIVESTOCK BUILDING

The invention relates to a climate control apparatus for a cleanroom livestock building and a method of operating the apparatus.

Cleanroom livestock buildings are livestock buildings for keeping animals which must be kept under germ-free or practically germ-free conditions. A typical reason for keeping animals in a germ-free environment is to prevent infections of the animals, in particular when the animals do not have immune defense systems or reduced immune responses due to a genetic predisposition. A typical application is the keeping of poultry such as hens, which are genetically predisposed in such a way that they have no immune defense system and which produce "serum" eggs. These serum eggs are used for numerous pharmaceutical purposes in order to produce medicines, in particular vaccines, by deliberately allowing antibodies to be produced and reproduced in such serum eggs.

One particular problem associated with such cleanroom livestock buildings is to maintain a climate, inside the livestock building, which reliably prevents the animals from acquiring diseases. These problems require that an elevated air pressure relative to the surroundings of the livestock buildings be permanently maintained in the cleanroom livestock building in order to reliably prevent any germs from getting into the livestock buildings through any leakages, doors, slits in buildings, or the like. Another requirement that must be met by such cleanroom livestock buildings is that the air temperature inside the livestock building be kept with specific narrow limits and in such a way that rapid fluctuations in temperature are prevented. This is necessary to a greater extent in the case of cleanroom livestock buildings, due to the greater sensitivity of the animals kept in them, than in the case of other livestock buildings in which animals are kept which have greater tolerance on account of their genetic predisposition to temperature fluctuations, not only with regard to the range of fluctuation, but also to the speed of fluctuations.

Finally, to maintain an acceptable climate in such cleanroom livestock buildings, it is essential that the building be provided with a permanent supply of fresh air containing oxygen and that the used air is removed from the building to ensure that the animals have a reliable supply of oxygen.

One particular problem that arises when controlling the climate in such cleanroom livestock buildings are fluctuations in the outdoor temperature that can occur over a wide range, depending on the season and the weather conditions. One object of the invention is to provide a climate control apparatus for a cleanroom livestock building, which maintains, in a more reliable and improved manner than prior art climate control apparatuses, a climate in the livestock building that allows animals with weak immune defense systems or without a developed immune defense system to be kept well.

This object is achieved according to the invention by a climate control apparatus for a cleanroom livestock building, comprising:

a supply air unit, comprising a supply air conveyor device, adapted to control the volume of supply air conveyed therewith, an exhaust air unit comprising an exhaust air conveyor device, adapted to control the volume of air conveyed therewith, a sensor unit comprising a temperature sensor and an air pressure sensor and a climate control unit in signal communication with the supply air unit, the exhaust air unit and the sensor unit, and which is adapted to reduce the volume of air conveyed by the exhaust air unit whenever the air pressure detected by the air pressure sensor falls below a predetermined lower air pressure limit value, to increase the volume of air conveyed by the exhaust air unit whenever the air pressure detected by the air pressure sensor exceeds a predetermined upper air pressure limit value, and to increase the volume of air conveyed with the supply air unit when the temperature detected by the temperature sensor exceeds a predetermined first upper temperature limit value.

According to the invention, the climate in the livestock building is controlled by means of a climate control unit which receives signals from a sensor unit and which also controls a supply air and exhaust air unit. The sensor unit comprises at least one temperature sensor and one air pressure sensor, which are placed in such a way that air pressure and temperature inside the livestock building can be measured, and that the respective measured values can be transmitted wirelessly or by wire to the climate control unit. More particularly, a plurality of temperature sensors may be arranged at a distance from each other in the livestock building, in order to detect local temperature variations and to take these into consideration when controlling the climate.

The supply air unit has an inlet opening for fresh air, which is typically sucked in from the outside, from the surroundings of the livestock building. To that end, the supply air unit has a supply air conveyor, in particular one or more fans which cause the supply air to be conveyed through the supply air unit. Each fan can preferably be set to at least two different air rates, in order to control the amount of air conveyed into the livestock building. The supply air conveyor can preferably be controlled in several levels or continuously, in order to control the amount of supply air. The supply air unit may also include one or more airflow control units with which the air passing through the supply air unit can be throttled or even completely blocked.

The exhaust air unit may also be structured in the same way as the supply air unit, by comprising one or more fans for conveying the air out of the livestock building through an appropriate outlet opening into the surroundings, and it may also include airflow control units for throttling the flow of air being discharged from the livestock building through the exhaust air unit, or for preventing the flow of exhaust air entirely.

The climate control unit has electronic components which are adapted to control the supply air unit and/or the exhaust air unit in such a way, depending on the signal from the temperature sensor and the air pressure sensor, that the amount of supply air conveyed is increased or reduced, and the amount of exhaust air removed is increased or reduced. This may basically be done, according to the invention, by controlling the supply air conveyor and/or the exhaust air conveyor with regard to their air conveying rate, and it is preferred in this regard that the supply air conveyor and the exhaust air conveyor be controlled with a matching control signal, as a result of which the air conveying rates of the supply air conveyor and the exhaust air conveyor are increased or reduced synchronously. Control of the supply air unit and the exhaust air unit can also be applied to the airflow control units inside the supply air unit and exhaust air unit, in that the throttling effect of one of the airflow control units is selectively increased or reduced in order to reduce or increase the amount of air being conveyed through the respective supply air unit and/or exhaust air unit.

Providing this kind of control capability and interconnecting the supply air unit and the exhaust air unit in this manner allows fine control over the climate in the livestock building, which in turn allows the various requirements regarding temperature, air throughput and air pressure inside the cleanroom livestock building to be fulfilled reliably, due to the various adjustment options, and to maintain compliance with narrower limit value ranges for all the climate parameters.

According to a first preferred embodiment, the supply air conveyor device includes a plurality of supply air conveyors which preferably differ from each other in their maximum conveying rates, and that the volume of air conveyed through the entire supply air unit by means of a single supply air conveyor is finely controlled, preferably in a first control range, preferably with a first, small maximum conveying rate, and that in a second control range the volume of air conveyed through the entire supply air unit by means of a further or other supply air conveyor is preferably controlled with a second, greater maximum conveying rate. This development of the invention provides an advantageous configuration of the supply air unit for achieving the required precision in controlling the supply air and exhaust air. At least two, or also more supply air conveyor devices are present therein, which are controlled independently of each other or with a controlled phase shift between them. In this way, it is possible for the volume of supply air to be controlled precisely in a small range of conveying rates, by controlling a single supply air conveyor, yet at the same time, either by connecting an additional supply air conveyor or alternatively by activating an air supply conveyor with a high volumetric conveying rate, to control the volume of supply air over a greater range of conveying rates and thus to achieve high volumetric rates of conveying. By virtue of this stepped switching of supply air conveyors with equal or stepped conveying rates, a broad range of volumetric conveying rates can be covered by the supply air unit as a whole, and be controlled precisely throughout that range of volumetric conveying rates. It is particularly preferred in this regard that the plurality of supply air conveyors are arranged in parallel in relation to the air flow, although a serial arrangement of the plurality of supply air conveyors may also be advantageous for certain applications.

It is still further preferred that the supply air unit comprise a first group of supply air throttle members having a first minimum throttling capacity in respect of the volume of air conveyed by the supply air unit, and a second group of supply air throttle members having a second minimum throttling capacity in respect of the volume of air conveyed by the supply air unit, the first minimum throttling capacity being less than the second minimum throttling capacity, and the first and second groups of supply air throttle members being arranged parallel to each other in relation to the flow of air conveyed through the supply air unit. Providing two such different airflow control units, which differ specifically in that they are designed for different maximum throughput rates, means that, when operating the climate control apparatus under normal climate conditions, in particular within typical outdoor temperature ranges, air can be supplied by means of the second airflow control device having the greater minimum throttling effect, which allows fresh air to be supplied to the livestock building largely without drafts and with a specific desired supply rate. It is also possible at the same time, however, especially under atypical climate conditions such as particularly high outdoor temperatures or in situations involving a sudden drop in pressure inside the cleanroom livestock building, to produce a high air conveying rate through the supply air unit by fully opening the first airflow control device having the smaller minimum throttling capacity, thus achieving a maximum supply of air.

It should be understood, as a basic principle, that each of the two groups may comprise a single airflow control member, but it is preferred, in particular for uniform distribution of the supply air in the livestock building, that each group comprises two or more airflow control members. A supply airflow control member is understood here to be any aerodynamically active member of component, such as a nozzle, an opening or the like, that can have a throttling effect on the supply of air. More specifically, a supply airflow control member may be set to a fixed throttling capacity, also representing in this case the minimum throttling capacity, or it may be variable in its throttling capacity, with the minimal adjustable throttling capacity occurring as a limit value for the range of adjustment.

It is still further preferred that the supply air unit includes an air heating device in signal communication with the climate control unit and that the climate control unit is adapted
- to increase the heat output of the air heating device whenever the temperature detected by the temperature sensor falls below a predetermined lower temperature limit value, and
- to reduce the heat output of the air heating device whenever the temperature detected by the temperature sensor exceeds a predetermined second upper temperature limit value, wherein the second upper temperature limit value is equal to or less than the first upper temperature limit value.

By providing an air heating device in the supply air unit, it is possible to preheat the fresh air being supplied from outside, thus providing additional heating, above all when it must be assumed on account of climate conditions that the temperature generated by the animals inside the livestock stock is not sufficient in itself to maintain a sufficiently high air temperature, particularly when the outdoor temperature is low. It should be understood as a basic principle in this regard that the additional heating is to be controlled in such a way, due to energy-saving targets, that only when the minimum required temperature cannot be maintained inside the livestock buildings when supplying the minimum required amount of supply air resulting from the required air pressure and air throughput inside the cleanroom livestock building, or when the temperature would drop too rapidly, is the supply air heated by the air heating device.

It is still further preferred that the exhaust air unit comprises a first group of exhaust airflow control members having a first minimum throttling capacity in respect of the volume of air conveyed by the exhaust air unit, and a second group of exhaust airflow control members having a second minimum throttling capacity in respect of the volume of air conveyed by the exhaust air unit, the first and second groups of exhaust airflow control members being arranged parallel to each other in relation to the volume of air conveyed through the exhaust air unit.

This configuration provides, for the exhaust air unit also, the advantageous arrangement of at least two groups of exhaust airflow control members that were described in the foregoing for the supply air unit. In this case also, a group may comprise two or more exhaust airflow control members which can be controlled independently of each other or with a controlled phase shift between them. The advantage achieved here is that the amount of air extracted through the exhaust air unit can be adjusted over a wide range of exhaust air conveying rates, and that precise regulation is achieved even in the range of small exhaust air conveying rates, by controlling in that range with just one group of exhaust airflow control members, whereas in the case of large exhaust air conveying rates, control is exercised with both groups of exhaust airflow control members or with a second group which has larger cross-sections and lower throttling capacities.

In this connection, it is still further preferred that the first minimum throttling capacity is greater than the second minimum throttling capacity. This configuration, which can also prove useful and be deployed in the same way for the supply air unit as well, allows the exhaust air conveying rate to be controlled particularly efficiently over a wide range of exhaust air rates by the parallel throttling action of exhaust airflow control members having different ranges of throttling capacity, in that the maximum throughput through the first group is smaller than through the second group.

It is still further preferred that the first group and the second group of exhaust airflow control members are in signal communication with the climate control unit and that the climate control unit is adapted
  to control the second group of exhaust airflow control members in such a way, whenever the air pressure detected by the air pressure sensor falls below a predetermined lower air pressure limit value, that their throttling effect is increased, and
  to control the first group of exhaust airflow control members in such a way, whenever the air pressure detected by the air pressure sensor does not exceed the predetermined lower air pressure limit value as a result of increasing the throttling effect of the second group, that the throttling effect of said first group is increased,
and/or
that the climate control unit is adapted
  to control the first group of exhaust airflow control members in such a way, whenever the air pressure detected by the air pressure sensor exceeds a predetermined upper air pressure limit value, that their throttling effect is reduced, and
  to control the second group of exhaust airflow control members in such a way, whenever the air pressure detected by the air pressure sensor does not fall below the predetermined lower air pressure limit value as a result of decreasing the throttling effect of the first group, that the throttling effect of said second group is reduced, With this development of the invention, cascading regulation of the air pressure inside the livestock building is achieved, in that the exhaust air conveying rate is regulated cascadingly by means of the first group and the second group of exhaust airflow control members, not only in respect of the maximum permissible upper air pressure limit, but also in respect of the lower minimum air pressure limit that is required. For fine control of the throttling effect, either just one group of exhaust airflow control members may be controlled, with the other group of exhaust airflow control members being kept closed for the duration, so that the other group of exhaust airflow control members can be added when a larger range of control must be achieved. Alternatively, even when the first group of exhaust airflow control members has a different throttling effect from that of the second group of exhaust airflow control members, it is possible to switch between the first and the second group of exhaust airflow control members as alternatives, in order to control the throttling effect in the exhaust air unit either by the first group or by the second group, with the respective other group being fully closed or fully opened, accordingly. This configuration allows climate control inside the livestock buildings, without major fluctuations in throughput and with correspondingly little drafts, while complying with narrow limit values for the air pressure, without doing away with a large range of control.

It is still further preferred that the first group and the second group of exhaust airflow control members are in signal communication with the climate control unit and that the climate control unit is adapted
  to control the first group of exhaust airflow control members in such a way, whenever the volume of air conveyed by the supply air unit falls below a predetermined first conveying rate, that their throttling effect is increased or reduced, and
  to control the second group of exhaust airflow control members or the first and second group of exhaust airflow control members in such a way, whenever the volume of air conveyed by the supply air unit exceeds the predetermined first conveying rate, that their throttling effect is increased or reduced.

This development of the climate control unit achieves a large range of control for the throttling effect in the exhaust air unit, in order to respond to different air rates through the supply air unit and without giving up the possibility of controlling the throttling effect particularly precisely and finely at high levels of throttling. In this way, the climate inside the livestock buildings can also be controlled efficiently at low levels of air pressure variation and temperature variation, without having to waive the possibility of having high air throughput volumes under special climate conditions. This development also makes it possible to control the temperature and air pressure in the livestock building efficiently and simultaneously.

It is still further preferred that the climate control unit be adapted to control a group of exhaust airflow control members when a different group of exhaust airflow control members has fallen below a predetermined gap from the limits of a set value for the throttling effect, in particular when the different group lies outside the range of 10-90%, 20-80%, 30-70% or 40-60% of its set value range. This development of the invention is based on the finding that, when a plurality of airflow control members are arranged in parallel and these airflow control members are cascadingly controlled, control flows can occur that lie, in particular, where the individual airflow control members throttle at the edge regions of their control signals. For many typical airflow control members used in such climate control devices, such as blocking members structured in the form of louvers whose individual lamellae can be continuously pivoted from an adjoining, blocking position to an open position in which the lamellae are aligned parallel to the air stream, it is the case that, particularly in the range where the maximum throttling effect and the minimum throttling effect can be set, there is no proportionality, advantageous for precise control, between the control variable and the throttling capacity. More particularly, it is possible that jumps in throttling capacity can occur in these ranges when there are only very slight changes in the control variable, or that only very small changes in throttling capacity occur despite large changes in the control variable. In order to counteract this problem, this development of the invention provides for overlapping control when a plurality of airflow control members are arranged in parallel and cascadingly controlled, such that whenever one of the airflow control members reaches the edge of its throttling capacity, where control is difficult, a second airflow control member is controlled in order to achieve more precise control in desired throttling capacity range. This is specifically preferred when two or more airflow control members are used that differ from each other in respect of their range of throttling capacity. In such a case, it may make sense to slightly open the airflow control member with the smaller minimum throttling capacity whenever the airflow control member with the greater minimum throttling capacity reaches its maximum opening range (corresponding to minimum throttling capacity), in order to improve the control response. Conversely, whenever the airflow control member with the lower minimum throttling capacity and what is then typically the larger range of throttling capacity reaches its maximum throttling effect (i.e., is almost completely closed), an airflow control member with a smaller range of throttling capacity and a larger minimum throttling capacity can already be controlled in order to improve the control response at this small rate of air conveying.

Finally, the climate control apparatus according to the invention may be further developed by the climate control unit having a first, second and preferably third control level and being adapted
- to control the temperature in the cleanroom livestock building in the first control level by reducing the volume of supply air when the temperature falls below a predetermined minimum temperature and/or by increasing the heat output of an air heating device contained in the supply air unit and in signal communication with the climate control unit,
- to control the pressure in the cleanroom livestock building in the second control level, by increasing the volume of supply air and/or reducing the volume of exhaust air when the pressure falls below a predetermined minimum pressure,
- maintaining a minimum required pressure in the cleanroom livestock building, in the third control level, by setting a maximum volume of supply air and reducing the exhaust air volume to zero when the pressure falls below the minimum required pressure,
- the first and second control levels exercising control with equal priority, and the third control level exercising control with priority over the first control level.

This development of the invention allows the different control targets for maintaining a favorable climate inside the livestock building to be complied with precisely by providing the appropriate control at two or more levels, without generating opposing control commands to the respective control elements, such as the conveyors, the airflow control members and the air heating devices. In normal operation, both the temperature inside the livestock building and the pressure are therefore kept in a desired range by parallel control processes, said range being characterized by a target pressure with a predefined maximum permissible upward or downward variation in pressure, and a corresponding target temperature with a maximum permissible upward or downward variation in temperature, but also by the stipulation that a minimum throughput of fresh air through the livestock building must be complied with. Only when it is not possible with this parallel control of pressure and temperature to maintain an essential minimum requirement for the climate in the livestock building, in the form of a minimum overpressure inside the building compared to the surroundings, is an alarm control performed on a third plane where an overpressure is set, regardless of the temperature in the livestock building, with controlling activity at the first control level being temporarily suspended.

The climate control unit may be configured in this regard to return at predetermined intervals, after control processes at the third control level, to control at the first and second control levels, in order to determine whether the desired ranges for pressure and temperature can be maintained again by parallel regulation of pressure and temperature, or whether there is a permanent state of emergency in the livestock building that requires permanent control at the third control level.

Another aspect of the invention concerns a method of controlling the climate in cleanroom livestock buildings, comprising the steps of feeding air into the cleanroom livestock building via a supply air unit provided with a supply air conveyor device, removing air from the cleanroom livestock building via an exhaust air unit provided with an exhaust air conveyor device, detecting the temperature and the air pressure inside the cleanroom livestock building by means of sensors, and controlling the supply air volumetric rate, the exhaust air volumetric rate and a heating capacity in order to heat the supply air according to the measured temperature and the measured air pressure such that inside the livestock building a temperature is controlled within a preset range and an air pressure is controlled within a preset range.

The method can be further developed by adding the steps of controlling the heating device in the supply air unit when the temperature in the cleanroom livestock building falls below a predetermined minimum temperature, supplying a minimum volumetric rate of supply air, and increasing the volumetric rate of supply air and simultaneously stopping the heating of supply air by means of the heating device when the temperature inside the livestock buildings exceeds a predetermined maximum value.

The method can be further developed by the steps of throttling the exhaust air by means of a plurality of airflow control members which are subdivided into at least two, preferably three groups of different airflow control members that differ in respect of their minimum throttling capacity, wherein only a first group of exhaust airflow control members is controlled when the air conveying rate of the supply air and/or exhaust air conveyor device is low, a second group of exhaust airflow control members with a larger minimum throttling capacity is controlled as an alternative or in addition to the first group of exhaust airflow control members when the air conveying rate of the supply air and/or exhaust air conveyor device is at a medium level and a third group of exhaust airflow control members with a larger minimum throttling capacity than the second group of exhaust airflow control members is controlled in addition or as an alternative to the second group of exhaust airflow control members when the air conveying rate of the supply air and/or exhaust air conveyor device is high.

The method can be further developed by the steps of opening a group of exhaust airflow control members of larger cross-section in a control situation in which a different group of exhaust airflow control members of smaller throttling capacity is not yet being controlled with the maximum control signal or is not yet fully opened.

It is preferred, finally, that the supply air conveyor device and the exhaust air conveyor device are controlled by means of a matching control signal from the climate control unit, or the supply air conveyor device comprises a first supply air conveyor member having a first maximum conveying rate and a second exhaust air conveyor member having a second maximum conveying rate that is greater than the first maximum conveying rate, said first and second air conveyor members being arranged parallel to each other in relation to the direction of air flow, wherein the two supply air conveyor members are preferably controlled with a single control signal and the first supply air conveyor element is adjusted in a first portion of the control signal from zero to the maximum conveying rate and the second supply air conveyor member is adjusted in a second adjustment portion from zero to the maximum conveying rate.

A preferred embodiment shall now be described with reference to the FIGURE.

Figure 1:
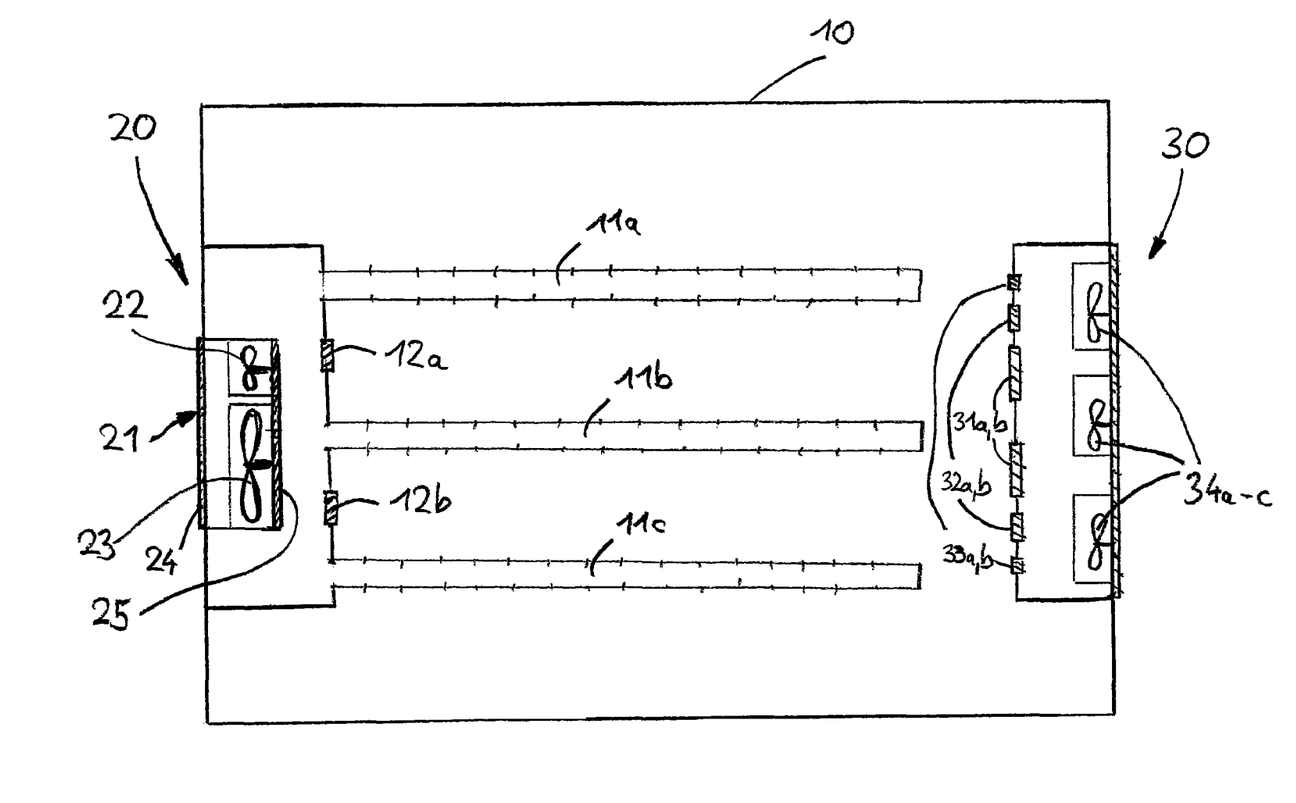

The FIGURE shows a schematic outline of a cleanroom livestock building. A livestock building (10) has a supply air unit (20) at its first end side and an exhaust air unit (30) at its opposite end side. Outside air is sucked in through an opening (21) into the supply air unit, for which purpose two fans (22, 23) are arranged inside the supply air unit in a supply air passageway. Between the inlet opening and the supply air fans, a two-stage prefiltering stage (24) is disposed, which filters out coarse and fine particles from the supply air.

Downstream from the fans (22, 23), on the pressure side of the supply air unit, a fine filtration unit (25) is disposed through which all the air transported through the supply air unit is guided and freed in the process of any germs. The air purified in this manner is fed to a plurality of perforated ventilation hoses (11a-c) extending in the longitudinal direction of the livestock building and having a plurality of small radial openings through which the supply air can escape into the livestock building. This results in draft-free, uniform ventilation of the livestock building with a specific air rate.

On the pressure side, there are also two air supply openings (12a, b) which can be opened or closed or partially opened by means of louvers. Large volumetric rates of airflow can be supplied to the livestock building through these supply air openings (12a, b), when this is necessary to cool the animals when outside temperatures are high.

The exhaust air unit (30) has a total of six exhaust air openings, each of which can be partially or completely closed by means of louvers. These six exhaust air louvers are grouped into a total of three groups (31a, b, 32a, b, 33a, b), each having two exhaust air louvers on the left and right end sides of the livestock building.

The exhaust air is extracted from the livestock building through the exhaust air louvers (31-33a,b) by means of four exhaust fans (34a, b, c).

The two supply air fans and the louvers of the supply air openings and the exhaust air louvers and the exhaust fans are in signal communication with a climate control unit and are controlled by this climate control unit according to sensor signals (not shown) received from a temperature sensor and a pressure sensor which detect the temperature and the pressure inside the livestock building. The climate is controlled in the following manner:

Outside air is sucked by the two supply air fans 22, 23 through prefiltration stages 24 into the supply air unit and is forced through microfilter 25, where it is freed of bacteria and viruses. The air filtered in this way then enters ventilation hoses 11a-c, from whence it is released through a number of radial openings into the livestock building. The first supply air fan 22 has a smaller air rate than the second supply air fan 23. In the embodiment, the small supply air fan 22 can be regulated within an air conveying range of 0-5,000 m$^3$/hr, whereas the large fan 23 can achieve an air conveying rate ranging between 0-45,000 m$^3$/hr. Both the supply air fans are controlled with a shared control signal which applies between zero and ten volts as a control variable to the fans. The small fan reaches its maximum airflow rate at 2 V, and from 2 V onwards the large fan is additional driven and conveys air. When the control variable is in the range between 2 and 10 V, the small fan is driven at its maximum capacity and the large fan is driven with continuous variation from an air conveying rate of zero to an air conveying rate of 45,000 m$^3$/hr. This method of control allows particularly fine control of the air supply when the volumetric rate of air conveying is in a low range, thus allowing particularly precise control of the temperature inside the livestock building, especially when outdoor temperatures are low.

When the outdoor temperatures are 0 C.° or less, the air is typically conveyed into the livestock building with a minimum air rate in order to ensure that the animals are supplied with oxygen. If the outdoor temperature is below 0 C°, the air is heated by means of a heating device (not shown) integrated in the supply air unit to such an extent that it is fed into the livestock building at a temperature of about 0 C°. The heat generated by the animals inside the livestock building is sufficient in this case to maintain a temperature of 20 C.° in the building.

At outdoor temperatures above 0 C°, the heat input is stopped and the volume of supply air is increased by increasing the air conveying rate of the small fan, in order to maintain a temperature of about 20 C.° in the livestock building.

If the outdoor temperature increases further, the volume of supply air conveyed must be further increased, which is done by driving the second, larger fan (23). In this case, the louvers of the supply air openings (12a,b) may open in addition, if necessary, in order to allow the higher volumetric flow of air to enter the livestock building.

The supply air supplied in this manner is removed again from the livestock building via exhaust air unit (30). The exhaust fans (34a-c) are driven with the same 0-10 V control signal with which the supply air fans are also driven, i.e., the air conveying rate of the supply air fans and the exhaust fans are increased or decreased in parallel. The exhaust fans are identical in design and have the same air conveying rate. They are also operated, like the supply air fans, in a parallel arrangement in relation to the direction of flow.

The opening cross-section of the exhaust air louvers (31-33a, b) is set by the climate control unit according to the pressure measured in the livestock building. The opening cross-section of the louvers is set according to the deviation of the air pressure inside the livestock building from the reference value and, in addition, according to the volume of air conveyed by the supply air unit. Three consecutive 0-10 V signals are used for this purpose. In the case of small air rates, only the first signal is used to set and partially open the first group of small exhaust air louvers (33a, b). As soon as this first group (33a, b) of exhaust air louvers is opened to the maximum extent, the second group of medium-sized exhaust air louvers (32a, b) is partially opened at higher air rates by means of a second control signal, and at even higher air rates the third group with the two large exhaust air louvers (31a, b) is actuated by means of a third control signal.

As a result of this cascading actuation of the three groups of exhaust air louvers, precise regulation is achieved over a large, controllable range of flow cross-sections. Control is made even finer by the first group of exhaust air louvers (33a, b) controlled with the first control signal having a smaller flow cross-section with a finer degree of control than the second group of exhaust air louvers (32a, b), which for their part have a smaller flow cross-section with a finer degree of control than the third group of exhaust air louvers (31a, b).

Cascading control is carried out in such a way that the next higher group of exhaust air louvers is already being actuated before the group of exhaust air louvers with the smaller flow cross-section has reached its maximum opening, in order to avoid any dead zones within the control regime. In the embodiment, the second group of exhaust air louvers begins to open as soon as the first group of exhaust air louvers has reached and exceeded 70% of its control signal. In the same way, actuation of the third group of exhaust air louvers begins as soon as the second group of exhaust air louvers has reached and exceeded 70% of its control signal.

Due to these three successive, overlapping, cascading ways of actuating the three groups of exhaust air louvers, the volumetric flow of exhaust air is controlled precisely and reliably over the entire range of airflow rates, from a very small volumetric flow rate of exhaust air to a large volumetric flow rate of exhaust air.

The invention claimed is:

1. A climate control apparatus for a cleanroom livestock building, comprising:
   a supply air unit, comprising a power-driven supply air conveyor device with a fan having an air conveying rate of between 500 and 45,000 m$^3$/hr, adapted to control the volume of supply air conveyed therewith,
   an exhaust air unit, comprising a power-driven exhaust air conveyor device with a fan, adapted to control the volume of air conveyed therewith,
   a sensor unit comprising a temperature sensor and an air pressure sensor and
   a climate control unit in signal communication with the supply air unit, the exhaust air unit and the sensor unit, and which is adapted
   to reduce the volume of air conveyed by the exhaust air unit whenever the air pressure detected by the air pressure sensor falls below a predetermined lower air pressure limit value;
   to increase the volume of air conveyed by the exhaust air unit whenever the air pressure detected by the air pressure sensor exceeds a predetermined upper air pressure limit value;
   to increase the volume of air conveyed with the supply air unit when the temperature detected by the temperature sensor exceeds a predetermined first upper temperature limit value;
   wherein the supply air conveyor device includes a plurality of supply air conveyors which differ from each other in their maximum conveying rates, and wherein the volume of air conveyed through the entire supply air unit by means of a first supply air conveyor is controlled, in a first control range at a first maximum conveying rate, and in a second control range the volume of air conveyed through the entire supply air unit by means of a second supply air conveyor controlled with a second, greater maximum conveying rate; and
   wherein said plurality of supply air conveyors are arranged in a parallel flow relation to each other.

2. The climate control apparatus according to claim 1, wherein the supply air unit comprises a first group of supply airflow control members having a first minimum throttling capacity in respect of the volume of air conveyed by the supply air unit, and a second group of supply airflow control members having a second minimum throttling capacity in respect of the volume of air conveyed by the supply air unit, the first minimum throttling capacity being less than the second minimum throttling capacity, and the first and second groups of supply airflow control members being arranged parallel to each other in relation to the flow of air conveyed through the supply air unit.

3. The climate control apparatus according to claim 1, wherein the supply air unit includes an air heating device in signal communication with the climate control unit and wherein the climate control unit is adapted to increase the heat output of the air heating device whenever the temperature detected by the temperature sensor falls below a predetermined lower temperature limit value, and to reduce the heat output of the air heating device whenever the temperature detected by the temperature sensor exceeds a predetermined second upper temperature limit value, wherein the second upper temperature limit value is equal to or less than the first upper temperature limit value.

4. The climate control apparatus according to claim 1, wherein the exhaust air unit comprises a first group of exhaust airflow control members having a first minimum throttling capacity in respect of the volume of air conveyed by the exhaust air unit, and a second group of exhaust airflow control members having a second minimum throttling capacity in respect of the volume of air conveyed by the exhaust air unit, the first and second groups of exhaust airflow control members being arranged parallel to each other in relation to the volume of air conveyed through the exhaust air unit.

5. The climate control apparatus according to claim 4, wherein the first minimum throttling capacity is greater than the second minimum throttling capacity.

6. The climate control apparatus according to claim 4, wherein the first group and the second group of exhaust airflow control members are in signal communication with the climate control unit and that the climate control unit is adapted to control the first group of exhaust airflow control members in such a way, whenever the volume of air conveyed by the supply air unit falls below a predetermined first conveying rate, that their throttling effect is increased or reduced, and to control the second group of exhaust airflow control members or the first and second group of exhaust airflow control members in such a way, whenever the volume of air conveyed by the supply air unit exceeds the predetermined first conveying rate, that their throttling effect is increased or reduced.

7. The climate control apparatus according to claim 6, wherein the climate control unit is adapted to control a group of exhaust airflow control members when a different group of exhaust airflow control members has fallen below a predetermined gap from the limits of a set value for the throttling effect, in particular when the different group lies outside the range of 10-90%, 20-80%, 30-70% or 40-60% of its set value range.

8. The climate control apparatus according to claim 1, wherein the climate control unit has a first, second, and third control level and is adapted:
   to control the temperature in the cleanroom livestock building in the first control level by reducing the volume of supply air when the temperature falls below a predetermined minimum temperature and/or by increasing the heat output of an air heating device contained in the supply air unit and in signal communication with the climate control unit;
   to control the pressure in the cleanroom livestock building in the second control level, by increasing the volume of supply air and/or reducing the volume of exhaust air when the pressure falls below a predetermined minimum pressure; and to maintain a minimum required pressure in the cleanroom livestock building, in the third control level, by setting a maximum volume of supply air and reducing the exhaust air volume to zero when the pressure falls below the minimum required pressure, the first and second control levels exercising control with equal priority, and the third control level exercising control with priority over the first control level.

9. The climate control apparatus according to claim 4, wherein the first group and the second group of exhaust airflow control members are in signal communication with the climate control unit and that the climate control unit is adapted to control the second group of exhaust airflow control members such that whenever the air pressure detected by the air pressure sensor falls below a predetermined lower air pressure limit value, the throttling effect is increased, and to control the first group of exhaust airflow control members such that whenever that the air pressure detected by the air pressure sensor does not exceed the predetermined lower air pressure limit value as a result of increasing the throttling effect of the second group, the throttling effect of said first group is increased.

10. The climate control apparatus according to claim 4, wherein the first group and the second group of exhaust airflow control members are in signal communication with the climate control unit and that the climate control unit is adapted to control the first group of exhaust airflow control members such that whenever the air pressure detected by the air pressure sensor exceeds a predetermined upper air pressure limit value, the throttling effect is reduced, and to control the second group of exhaust airflow control members such that whenever the air pressure detected by the air pressure sensor does not fall below the predetermined lower air pressure limit value as a result of decreasing the throttling effect of the first group, the throttling effect of said second group is reduced.

11. The climate control apparatus according to claim 9, characterized in that the climate control unit is adapted to control a group of exhaust airflow control members when a different group of exhaust airflow control members has fallen below a predetermined gap from the limits of a set value for the throttling effect, in particular when the different group lies outside the range of 10-90%, 20-80%, 30-70% or 40-60% of its set value range.

12. A climate control apparatus for a cleanroom livestock building, comprising:
a supply air unit, comprising a power-driven supply air conveyor device with a fan, adapted to control the volume of supply air conveyed therewith,
an exhaust air unit, comprising a power-driven exhaust air conveyor device with a fan and an exhaust air louver, adapted to control the volume of air conveyed therewith,
a sensor unit comprising a temperature sensor and an air pressure sensor and a climate control unit in signal communication with the supply air unit, the fan and the exhaust air louver of the exhaust air unit, and the sensor unit, and which is adapted
to reduce the volume of air conveyed by the exhaust air unit whenever the air pressure detected by the air pressure sensor falls below a predetermined lower air pressure limit value;

to increase the volume of air conveyed by the exhaust air unit whenever the air pressure detected by the air pressure sensor exceeds a predetermined upper air pressure limit value;
to increase the volume of air conveyed with the supply air unit when the temperature detected by the temperature sensor exceeds a predetermined first upper temperature limit value;
wherein the exhaust air louver and the fan of the power-driven exhaust air conveyor device are controlled by said climate control unit according to a sensor signal of said sensor unit in such a way that the opening of the cross-section of the exhaust air louvers is set by the climate control unit according to the pressure measured in the livestock building.

13. The climate control apparatus of claim 12, wherein the exhaust air louvers comprise a first group of small exhaust air louvers and a second group of larger exhaust air louvers, wherein the first group of small exhaust air louvers is actuated by means of a first control signal and the second group of large exhaust air louvers is actuated by means of a second control signal.

14. A climate control apparatus for a cleanroom livestock building, comprising:
a supply air unit, comprising a power-driven supply air conveyor device with a fan, adapted to control the volume of supply air conveyed therewith,
an exhaust air unit, comprising a power-driven exhaust air conveyor device with a fan, adapted to control the volume of air conveyed therewith,
a sensor unit comprising a temperature sensor and an air pressure sensor, and
a climate control unit in signal communication with the supply air unit, the exhaust air unit and the sensor unit, and which is adapted:
to reduce the volume of air conveyed by the exhaust air unit whenever the air pressure detected by the air pressure sensor falls below a predetermined lower air pressure limit value;
to increase the volume of air conveyed by the exhaust air unit whenever the air pressure detected by the air pressure sensor exceeds a predetermined upper air pressure limit value;
to increase the volume of air conveyed with the supply air unit when the temperature detected by the temperature sensor exceeds a predetermined first upper temperature limit value;
to control the temperature in the cleanroom livestock building in a first control level by reducing the volume of supply air when the temperature falls below a predetermined minimum temperature and/or by increasing the heat output of an air heating device contained in the supply air unit and in signal communication with the climate control unit;
to control the pressure in the cleanroom livestock building in a second control level, by increasing the volume of supply air and/or reducing the volume of exhaust air when the pressure falls below a predetermined minimum pressure; and
to maintain a minimum required pressure in the cleanroom livestock building, in a third control level, by setting a maximum volume of supply air and reducing the exhaust air volume to zero when the pressure falls below the minimum required pressure, the first and second control levels exercising control with equal priority, and the third control level exercising control with priority over the first control level.

\* \* \* \* \*